United States Patent
Dussel

[15] 3,692,060
[45] Sept. 19, 1972

[54] LONGITUDINALLY DIVIDED TUBE AND METHOD OF MAKING THE SAME

[72] Inventor: Paul E. Dussel, Ravenna, Ohio 44266

[73] Assignee: Falls Machine Company, Summit, Ohio

[22] Filed: March 31, 1971

[21] Appl. No.: 129,679

[52] U.S. Cl. ............138/89, 138/171, 138/111, 29/475, 29/482
[51] Int. Cl............B23k 1/20, F16l 9/18, F16l 59/10
[58] Field of Search..........138/89, 92, 111, 115, 116, 138/117, 155, 171; 29/471.1, 475, 482, 483

[56] References Cited

UNITED STATES PATENTS

| | | | |
|---|---|---|---|
| 2,218,127 | 10/1940 | Urschel | 138/117 |
| 2,420,715 | 5/1947 | Millward | 138/116 |
| 3,625,258 | 12/1971 | Phelps | 138/115 |

*Primary Examiner*—William R. Cline
*Attorney*—Oldham & Oldham

[57] ABSTRACT

A tube length which is divided into two separate passages by a longitudinally extending wall. The tube is formed by the steps of providing diametrically opposed longitudinal slots in the walls of a tube with the slots extending somewhat less than the entire length of the tube to leave solid portions thereof at either end, positioning a metal plate within the slots, welding the plate to the tube walls, subsequently machining the outer cylindrical surface of the tube to provide a smooth surfaced tube of the desired external diameter, removing both end portions of the tube to leave a tube portion having the dividing wall along its entire length, capping both ends of the tube, and providing a plurality of holes in the tube walls on either side of the plate.

12 Claims, 12 Drawing Figures

PATENTED SEP 19 1972 3,692,060
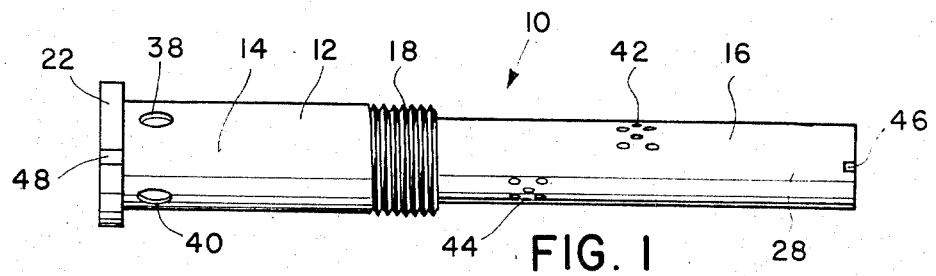
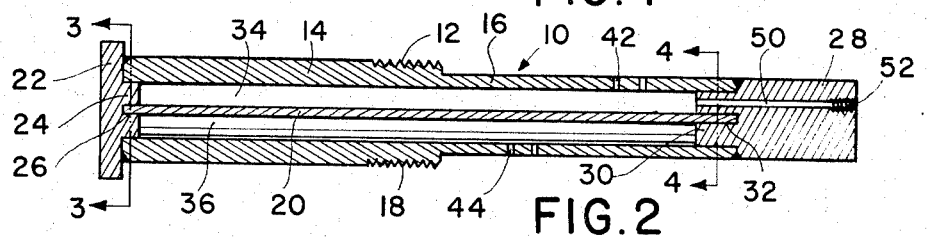
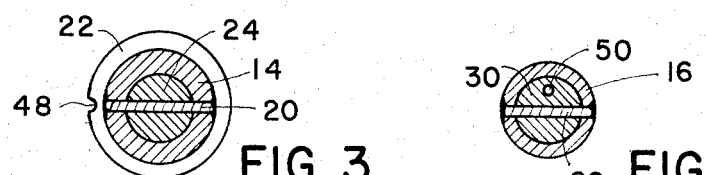 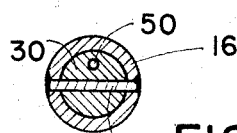
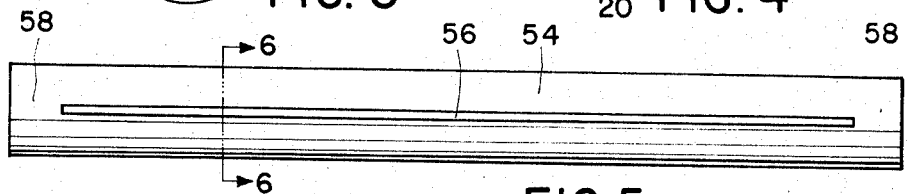
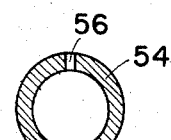 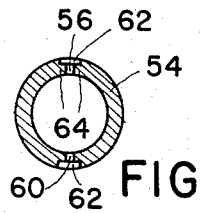 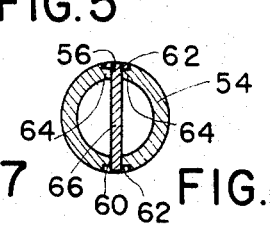
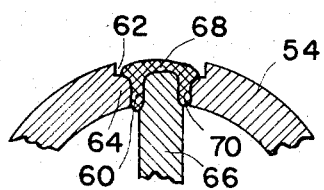 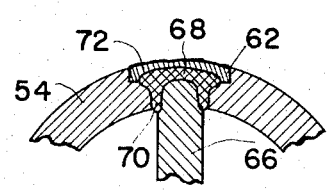 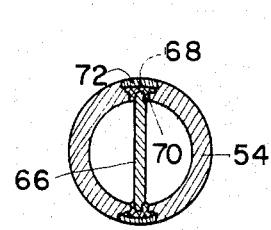
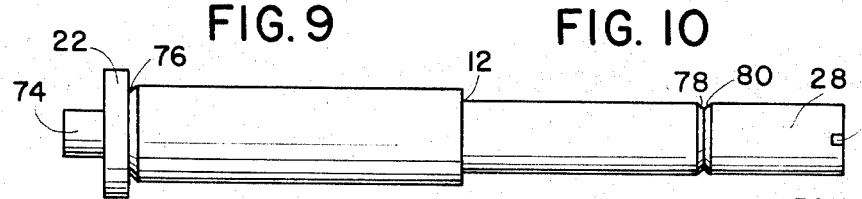
INVENTOR.
PAUL E. DUSSEL
BY Oldham & Oldham
ATTORNEYS

LONGITUDINALLY DIVIDED TUBE AND METHOD OF MAKING THE SAME

The present invention relates to a tube length which is divided longitudinally into two semi-cylindrical chambers and to the method of making such a divided tube. The tube may be used, for example, to provide air supply and return passages between the control valve and motor assemblies of an air driven tool such as the tool shown in my application, Ser. No. 129,680 filed Mar. 31, 1971 for REVERSIBLE DRIVE TOOL. Such an assembly includes an air motor which, through suitable gearing, drives a tool bit which may, for example, be a tube expander mandrel, a drill, or a tap. The air motor is contained within a housing and connected to a piston which is slidably received in the housing. A control valve assembly regulates air supply to both the piston and the air motor to advance the air motor and tool bit toward the work piece when the motor rotates in one direction and to retract the motor and tool bit from the work piece while rotating the motor in the opposite direction. Since the air motor and piston move relative to the valve assembly, there must be a sliding connection between the valve assembly and the piston and air motor. In order to permit the reversing action of the motor and piston, separate passages must be provided for forward and reverse air flow between the valve assembly and the air motor and piston.

It is the primary object of the present invention to provide a tube having two separate semi-cylindrical chambers extending the length thereof and to provide a method of making such a divided tube.

It is also an object of the present invention to provide such a tube which may be used as the air supply and return connections between the valve assembly and the air motor and piston assemblies of a reversibly air driven tool.

A further object of the present invention is the provision of a method for forming a longitudinally divided tube.

A still further object of the invention is a provision of a method of forming a longitudinally divided tube which permits the tube to be formed to a high level of tolerance.

The above and other objects of the invention which will become apparent in the following detailed description are achieved by providing a method of forming a longitudinally divided tube which consists, essentially, of the steps of slotting a tube length longitudinally to form two diametrically opposed slots extending substantially the entire length of the tube but leaving the end portions thereof unslotted, positioning a metal plate within the slot to divide the interior of the tube into semi-cylindrical passages, welding the plate to the tube along the entire length of each slot, removing both end portions of the tube to provide a tube section having a longitudinal center wall along its entire length, capping each end of the tube length with tight fitting end caps which are preferably welded to the tube length, and subsequently machining the tube length to provide a plurality of holes through the tube wall into each of the semi-cylindrical passages and to provide a smooth outer cylindrical surface for the tube length.

For a more complete understanding of the invention and the objects and advantages thereof reference should be had to the following detailed description and the accompanying drawing wherein there is shown a preferred embodiment of the invention.

In the drawing:

FIG. 1 is a side elevational view of one embodiment of the present

FIG. 2 is a longitudinal sectional view of the tube of FIG. 1;

FIGS. 3 and 4 are transverse sectional views taken along the lines 3—3 and 4—4, respectively, of FIG. 2;

FIG. 5 is a side elevational view of a tube length showing one step in the method of forming the divided tube of the present invention;

FIGS. 6, 7, and 8 are transverse sectional views showing successive steps in the divided tube forming process;

FIGS. 9 and 10 are enlarged fragmentary transverse sectional views showing further steps in the tube forming process;

FIG. 11 is a transverse sectional view illustrating a still further step in the tube forming process; and FIG. 12 is a side elevational view showing the divided tube of the present invention with the end caps positioned thereon but prior to the welding of the end caps to the tube length.

Referring first to FIGS. 1 – 4, there is shown a tube assembly 10 which may be used as the air supply and return tube of the reversible drive tool described in the above mentioned application. The tube assembly includes a tube length 12 having a first diameter portion 14 and a second smaller diameter portion 16. The large diameter portion 14 of the tube 12 may be threaded, as shown at 18, to provide a mechanical connection between the tube and piston assembly of the reversible drive tool. The tube 12 is divided along its entire length into two semi-cylindrical chambers by the internal wall 20. One end of the tube assembly is sealed by the end cap 22 which has a boss portion 24 projecting into the interior of the tube 12 and slotted at 26 to receive the dividing wall 20. An end cap 28 seals the opposite end of the tube 12 and also has an inwardly projecting boss 30 with a slot 32 for receiving the dividing wall 20. The interior of the tube 12 is thus divided into two separate compartments 34 and 36. A hole 38 communicates with the chamber 34 with one end of the tube 12 and a plurality of holes 42 also communicate with chamber 34, with these holes 42 being located on the smaller diameter portion 16 of the tube 12. Likewise, a hole 40 communicates with chamber 36 closely adjacent the end cap 22 and a plurality of holes 44 are provided in the smaller diameter portion 16 of the tube 12 in communication with the chamber 36. The number and location of the holes through the tube walls will, of course, depend on the intended use of the tube. The arrangement shown is illustrative only. The end cap 28 may be provided with a notch 46 to indicate the direction of alignment of the dividing wall 20. An aligning notch 48 may be provided in the end cap 22 to permit the tube assembly to be properly aligned with the piston and the air motor.

Referring now to FIGS. 5 – 12 the method by which the divided tube of the present invention is made will now be described. It will be understood that, unless otherwise specified, the dimensions referred to in the following description are illustrative only.

A cold drawn seamless tube is cut to a length several inches longer than the desired length of the finished tube. This tube 54 has an internal diameter equal to the desired internal diameter of the finished tube, for example, nine-sixteenths of an inch, and an external diameter somewhat greater than the external diameter of the finished tube. For example, the external diameter of the tube may be three-fourth inch. The tubing length 54 is positioned between the centers of a drive of a milling machine. A slot 56 is then cut into one side of the tube length 54 with the slot extending parallel to the axis of the tube and in a plane passing through the axis. The slot terminates short of each end of the tube, leaving unslotted portions 58. The slot 56 may be of one-sixteenth inch width and extending 1½ to 3 inches of the ends of the tube. A tube 54 is then revolved 180° and an identical slot 60 is cut into the tube diametrically opposite the first slot 56. The slots 56 and 60 are now enlarged by an end mill cutter to provide wider slot portions 62. The widened portions 62, are, for example, three-sixteenths inch in width and extend the full length of the slots 56 and 60. The enlarged portion 62 extends a depth of one-sixteenth inch leaving lands one thirty-second inch in thickness and one-sixteenth inch in width along the sides of each of the slots 56 and 60. A steel plate 66 of the same thickness as the width of the slots 56 and 60 and of the same length as these slots is then positioned in the slots. The plate 66 is of a height substantially equal to the external diameter of the tube length 54.

As can be seen most clearly from FIG. 9, the plate 66 is now welded to the tube 54 both at the slot 60 and the slot 56. The welding is preferably performed by arc welding in an inert gas atmosphere such as Heli-Arc welding. This welding is performed without the addition of any weld metal and results in the melting of the end of the plate 66 and the edges of the land 64 of the slots in the tube 54, producing complete fusion between the tube 54 and the plate 66, as indicated at 68. It will be noted that the weld extends the full depth of the slot 60, producing a small bead 70 on the interior of the tube 54. The weld 68 does not completely fill the enlarged outer portion 62 of the slot 56 or 60. Additional weld material 72 is built up to fill the grooves 62, this material 72 also being supplied by an inert gas arc welding process. It will be noted that the unslotted end portions 58 of the tube length 54 are of sufficient size to maintain the structural integrity of the tube even after the slots 56 and 60 have been formed therein. As a result, the plate 66 is precisely positioned and uniform tolerance is maintained between the plate 66 and the land 64 along the entire length of each slot so that uniform high quality weld can be formed along the entire length of the plate 66. As will be apparent to those familiar with welding processes, the relative dimensions of the lands 64, groove 62, and the thicknesses of the tube wall and plate 66 effect the quality of the weld and must, therefore, be maintained within certain limits of the dimensional relationships disclosed herein.

The welded tube and plate assembly is now heated and gradually cooled to provide for the relief of all stresses induced by the welding process. The tube lengths are then inspected and straightened, if necessary. The tube assemblies are precisely centered and turned on a lathe to produce a cylindrical external surface of a diameter greater than the finished diameter of the tube. The end portions 58 of the tube length 54 are now cut from the tube and the tube length 54 end milled to the desired length. The weld beads 70 which protrude into the interior of the tube 54 are removed at the end portions of the tube, for example, by hand filing. The end caps 22 and 28 are now press fitted onto the ends of the tube length 54. As was pointed out above, the end cap 22 has a slotted boss 24 and the end cap 28 has a boss 30 which is slotted at 32. These slots are of lesser thickness than the thickness of the plate or webs 66, for example, the slots 26 and 32 may be of a thickness of 0.060 inch when used with a plate of thickness of 0.062 to 0.065 inches. It will be noted that the end cap 28 is provided with a notch 46 which is aligned with the web 20. This notch is necessary in order to indicate the position of the plate or web 20 after the end caps have been positioned since, after the external surface of the tube length 54 has been turned, there is no visual indication of the position of the web 20. The end caps 22 and 28 are welded to the opposite ends of the tube length 12, the ends of the tube 12 being chamfered as indicated at 76 and 78 as is the adjacent end 80 of the end cap 28. The resulting grooves are filled with weld material, for example by Heli-Arc welding. The external surfaces of the tube 12 and end caps 22 and 28 are now turned to nearly the final external diameter and subsequently ground to the finished diameter which may, for example, be 0.740 inches. The reduced diameter portion 16 is now turned down to size and the end of the large diameter portion 14 is threaded as indicated at 18. The holes 38, 40, 42 and 44 are also drilled at this time. The assembly is completed by removing the projecting boss 74 from the end cap 22 and inspecting the cylindrical surfaces 14 and 16 for surface defects which are filled with soft solder, if required. The end cap 28 may be provided with a passage 50 extending into the chamber 34. This passage 50 is threaded at its outer end as indicated at 52 for connection to the sensing unit of the controls of the reversible driving tool.

It will be understood that the external configuration shown, the number and location of the holes through the tube walls, and the end cap configurations may be varied as desired, depending on the desired end use of the tube assembly.

The objects of the invention are thus clearly achieved by the provision of a method of making a tube which is divided longitudinally into two separate internal passages which are air-tight relative to one another.

While only the best known embodiment of the invention has been illustrated and described in detail herein the invention is not limited thereto or thereby. Reference should therefore be had to the appended claims in determining the true scope of the invention.

What is claimed is:

1. The method of forming a longitudinally divided tube, comprising the steps of:

cutting first and second longitudinally extending slots through diametrically opposite portions of the walls of a metal tube length, the tube length having an internal diameter equal to the internal diameter of the divided tube and being longer than the divided tube, the slots being aligned with one another, of length at least as great as that of the divided tube and terminating short of either end of the tube length;

positioning a metal plate within the slots, the plate having a length and thickness equal, respectively, to the length and thickness of the slots;

welding the plate to the tube length along the entire length of each slot; and cutting the tube length to the length of the divided tube, the tube length being cut at both ends to remove the portions thereof which do not contain the plate.

2. The method according to claim 1 which includes the step of widening the radially outer portions of the slots prior to the positioning of the metal plate, the widened portions of the slots being of a depth less than the thickness of the wall of the tube length.

3. The method according to claim 2 which includes the step of filling the widened portions of the slot with weld metal after the plate has been welded to the tube length, the slots being filled to at least the outer surface of the tube.

4. The method according to claim 4 which includes the steps of machining the external surface of the tube length after the welding steps to produce a smooth cylindrical surface.

5. The method according to claim 1 which includes the further step of welding end caps to each end of the divided tube.

6. The method according to claim 5 which includes the step of drilling at least two holes through the wall of the tube on either side of the plate.

7. The method of forming a tube having two separate semi-cylindrical internal passages, which comprises the steps of a. cutting a cold drawn seamless tube to a length greater than the length of the finished tube;

b. slotting the tube length longitudinally along diametrically opposite sides, the slots being of a length at least equal to the length of the finished tube but terminating short of either end of the tube length;

c. milling the tube length along each of the slots to enlarge the radially outer portions of the slots, the enlarged portions having a depth less than the thickness of the tube wall;

d. positioning a steel plate within the slots, the plate having a length, thickness, and height substantially equal to the length of the slots, the width of the slots, and the external diameter of the tube length, respectively;

e. welding the steel plate to the tube length along the entire length of each groove;

f. removing the unslotted end portions of the tube length;

g. sealing each end of the tube length; and h. drilling at least two holes through the tube wall on each side of the steel plate.

8. The method according to claim 7 wherein the welding of step (e) is performed by arc welding in an inert gas atmosphere.

9. The method according to claim 8 wherein step (e) includes a first welding operation joining the plate to the tube walls without the addition of any weld metal and a second welding operation in which additional material is supplied to completely fill the enlarged portions of the grooves.

10. The method according to claim 9 which includes the additional step of machining the outer surface of the tube length after the performance of step (e).

11. A longitudinally divided tube, comprising:

a generally cylindrical steel tube forming the outer portion of the divided tube;

an elongated steel plate forming an internal wall dividing the interior of the tube into two semi-cylindrical passages, opposed lateral edges of the plate projecting, respectively, into slots extending longitudinally along diametrically opposite sides of the steel tube, the plate being welded to the tube along the slots; and end caps sealing each end of the divided tube.

12. The longitudinally divided tube according to claim 11 wherein each end cap has a first portion of a diameter at least as great as the external diameter of the tube and a second portion of a diameter equal to the internal diameter of the tube, the second portion being slotted to receive the internal wall.

* * * * *